United States Patent Office 3,462,417
Patented Aug. 19, 1969

3,462,417
REFINEMENTS IN THE DISTILLATION OF LACTAMS FROM SOLUTIONS THEREOF
Karl-Hans Simmrock and Gunther Strauss, Marl, Germany, assignors to Chemische Werke Huls A.G., Marl, Germany
No Drawing. Filed Sept. 6, 1966, Ser. No. 577,172
Claims priority, application Germany, Sept. 6, 1965, C 36,809
Int. Cl. C07d 41/06
U.S. Cl. 260—239.3                19 Claims

ABSTRACT OF THE DISCLOSURE

In the production of lactams, particularly laurolactam, by the sulfuric acid rearrangement of oximes wherein the lactam is extracted from the reaction mixture by a solvent immiscible in sulfuric acid, the improvement in recovering the lactam from the solvent mixture without polymerization or crystallization, comprising the steps of:
(a) Adding an intermediate boiling compound to the lactam dissolved in a solvent, said intermediate boiling compound being miscible with the lactam and solvent phase under distillation conditions, and having a boiling point under distillation conditions higher than the boiling point of said solvent, lower than the boiling point of said lactam, and not substantially lower than the melting point of the lactam;
(b) Distilling said solvent as overhead from the mixture of said intermediate boiling compound and said lactam; and
(c) Distilling said intermediate boiling compound from said lactam.

---

The present invention relates generally to an improvement in the process of manufacturing lactams by the Beckmann rearrangement of cyclic ketoximes in the presence of concentrated $H_2SO_4$ or oleum, and particularly to the composition and method for recovering the lactams from a mixture of solvents by distillation.

According to the prior art methods of lactam production such as disclosed in U.S. Patent No. 2,817,661, cyclopentanone oxime, cyclohexanone oxime, cycloheptanone oxime and alkylated derivatives thereof are subjected to the Beckmann rearrangement in the presence of concentrated $H_2SO_4$ (e.g. 90–100%) or oleum. The oximes, produced by the oximation of cycloaliphatic ketones, are reacted with concentrated $H_2SO_4$ and substantial amounts of heat are developed.

The prior art was further advanced by the disclosures of Gunther Strauss and Walter Thomas in their U.S. patent application Ser. No. 524,395, filed Feb. 2, 1966, and entitled "Process for the Continuous Manufacture of Laurolactam in the Liquid Phase," the disclosures of which are incorporated herein. Application Ser. No. 524,395 will hereafter be referred to as the basic application.

According to the basic application laurolactam is continuously produced in the liquid phase by the Beckmann rearrangement of cyclododecanone oxime with sulfuric acid or oleum when the following conditions and steps are employed:
(a) An extraction stage is employed wherein the oxime dissolved in a solvent substantially immiscible with sulfuric acid or oleum is mixed with concentrated sulfuric acid or oleum at temperatures of 0–60° C., preferably 20–50° C., and the specific heat of the materials introduced as well as the heat produced by the combination of the oxime with the sulfuric acid are removed;
(b) An oxime-sulfuric acid phase free of solvent is separated from a solvent phase free of oxime;
(c) The oxime-sulfuric acid is passed to a rearrangement stage, and the oxime is rearranged into the lactam at temperatures between 60 and 140° C., preferably between 90 and 120° C.;
(d) The lactam-sulfuric acid mixture is passed to a hydrolysis stage, where water as well as the solvent employed in the extraction stage are added;
(e) A lactam-containing solvent phase is separated from a dilute sulfuric acid phase substantially free of lactam, and; finally
(f) The lactam-containing solvent phase is washed and then processed by fractional distillation.

Although cyclododecanone oxime is a preferred starting material for conversion to the corresponding lactam by the process of the basic application, the following oximes can also be processed in the basic application and also by this invention; cyclooctanone, cyclononanone, cyclodecanone and cycloundecanone.

In carrying out the process of the basic application a considerable number of problems are encountered during the distillation of the lactam-containing washed solvent phase. Since losses from polymerization increase very rapidly with rise of sump temperature, the sump temperature of the column is kept a slow as possible. This is accomplished by conducting the distillation of the solvent under a moderately high vacuum. Under such a vacuum, however, the boiling point range of the lactam-solvent mixture is lowered below the melting point of the lactam (152° C.), and solid crystals thereof are eventually produced in the column upon evaporation of the solvent.

It is a primary object of the present invention to provide an improved process for the production of laurolactam by the Beckmann rearrangement of cyclododecanone oxime.

Another object of the invention is an improved process for preparing lactams by the Beckmann rearrangement comprising the preparation of oxime-sulfuric acid solution and the rearrangement of the solution under controlled temperature conditions.

Still another object of the invention is the use of a solvent substantially immiscible in concentrated sulfuric acid for the solution of the oxime used in the Beckmann rearrangement followed by separation and reuse of the solvent in the hydrolysis of the lactam-sulfuric acid solution produced by the rearrangement.

A particular object of the invention is the prevention of lactam precipitation in the distillative separation of the lactam from the solvent substantially immiscible in concentrated sulfuric acid by the use of an additional liquid intermixed therewith.

Still further objects and the entire scope of applicability of the present invention are apparent from the detailed description, examples and claims which follow.

According to the present invention, it has been discovered that the distillative working-up process can be carried out more advantageously by conducting the distillation of the washed, lactam-containing solvent phase in the presence of an additional liquid whose boiling point under distillation conditions is between the boiling point of the laurolactam and the boiling point of the solvent to be separated, and preferably above the lactam melting point.

The purpose of the additional liquid of the present invention is:
(1) By virtue of its boiling point, which is considerably lower than that of the lactam, to lower the sump temperature and thereby retard the production of polymerized product, or, at the same sump temperature, to make a distillation possible at a higher internal pressure in the column;
(2) By its presence in the reaction mixture to avoid crystallization within the column, since the distillation can then be performed under higher pressure so that the boiling temperature and the solubility of the lactam in the solvent are then increased; and (3) To change the distillation conditions in such a manner that the solvent can be condensed at the head of the column without the use of brine.

Basically, these additional liquids (intermediate boiling compounds) must obey the following conditions:

(a) Be miscible with the reaction mixture under the distillation conditions;

(b) Boil, under the distillation conditions, higher than the first solvent by preferably at least 10° C., and lower than the lactam by preferably at least 10° C.; and (c) Boil not substantially below, preferably not more than 20° C., the melting point of the lactam (the melting point of laurolactam being 152° C.).

As contrasted with this additional liquid the particularly suitable solvents useful in the basic application are cycloaliphatic hydrocarbons, such as, for example, hydrocumene, but also aliphatic hydrocarbons of a suitable boiling point range can be employed. Other suitable solvents are n-decane, n-undecane, and n-dodecane.

(Hereinafter, by the term "immiscible" with sulfuric acid is meant that the solvent is substantially immiscible with sulfuric acid and likewise by the term "free" used in step (b) and in the basic specification is meant substantially free, that is to say, the oxime-sulfuric acid phase should contain not more than 1 or 2% of the solvent.)

The use of aromatic solvents in the basic application is not excluded, but is to be avoided generally because they are readily sulfurized. Useful aromatic solvents are isopropylbenzene and di-isopropylbenzene.

The aliphatic, cycloaliphatic and aromatic hydrocarbon solvents of the basic application have a suitable boiling point between 80 and 120° C. under atmospheric conditions.

The suitable additional liquids, also called intermediate boiling compounds, are higher boiling solvents or mixtures thereof, i.e., those which boil under the distillation conditions above the lactam melting point of 152° C., for example, diisopropylcyclohexane, cyclododecane, cyclododecanone and cyclododecanol. Particularly suitable is cyclododecanone since the crude lactam from the synthesis step can still contain minor amounts of this substance which can then be recovered without difficulty, together with the added liquids.

For the production of laurolactam, the additional liquids or intermediate boiling compounds, for example cyclododecanone are distilled at a pressure below 100 mm. Hg (torr), preferably at 20–60 mm. Hg, with a resulting boiling point range between 148 and 178° C.

The solvent employed as the intermediate boiling compound is advantageously recycled. The additional liquid can be fed to the distillation apparatus, for example to the middle portion of the distillation column, separately from the lactam-containing solvent phase coming from the hydrolysis stage. It is also possible to feed this additional liquid into the lactam solution at any suitable place either during or after the hydrolysis stage and introduce it as a homogeneous mixture into the distillation plant with the product to be distilled. The feeding of the additional liquid is therefore independent of the production of the lactam. The amount of additional liquid is variable; in general, it amounts to 5–30 parts by weight, preferably 5–15 parts by weight, per 100 parts of lactam in addition to the solvent of the basic application which amounts in general to 900 to 150 parts by weight, preferably 400 to 230 parts by weight per 100 parts of lactam.

The improved mode of operation, however, is particularly suitable for the two embodiments mentioned in the basic application wherein only a single solvent is employed. In the basic application, FIGURE 1 is a flow sheet of a preferred embodiment of the invention showing the use of the same solvent in the extraction and hydrolysis stages; and FIGURE 2 is a flow sheet embracing a modification of the process shown in FIGURE 1 facilitating the use of the solvent in variable concentrations.

The cyclododecanone oxime is employed in the form of a solution, as has already been disclosed in the basic application. This solution can be obtained by conversion of the ketone into the oxime in the presence of the solvent, or by subsequent extraction of the oximation mixture with the solvent. If desired, the solution can be obtained by dissolving the suitably isolated oxime in the solvent.

The solvents exhibit, at least at a higher temperature, a sufficient solubility for the oxime, as well as for the lactam. They must be stable in the presence of sulfuric acid or oleum in the extraction stage at the temperatures employed therein and they must not mix with the sulfuric acid or oleum under the conditions of the extraction stage.

Since the reaction temperature in the preceding oximation stage is generally 80–120° C. with elevated pressures being used if necessary, solvents of a suitable boiling point range are those which remain liquid under the oximation reaction conditions.

Generally, the oxime solution is employed in the same state as it was produced, i.e. at temperatures of 80–110° C., preferably 90–100° C. It is also possible to use solutions at lower temperatures.

In the first stage of the process, i.e. the extraction stage, the oxime solution is continuously mixed with concentrated sulfuric acid or oleum, as already disclosed in the basic application. During this stage the conditions set forth in the basic application are maintained. The extraction is performed at temperatures of 0–60° C., particularly 20–50° C., so that a strongly exothermic spontaneous rearrangement reaction is avoided.

The heat produced by the preferred extraction of the oxime into the sulfuric acid along with the heat introduced by warm oxime solution is removed by cooling means.

The quantity of the sulfuric acid used is sufficient to produce a usable viscosity in the oxime-containing sulfuric acid produced within the above-mentioned temperature range, and is sufficient for the subsequent rearrangement stage. The sulfuric acid employed, based on 1 part of oxime, is generally about 1 to 1.5 parts by weight.

The viscosities for the weight proportions of oxime to sulfuric acid of 1 to 0.8 are:

at 20° C.:20,000 centipoises
at 40° C.:2,700 centipoises at a weight proportion of 1:1.25:

at 20° C.:987 centipoises
at 40° C.:330 centipoises

The extraction is conducted in apparatus suitable for the continuous mixing of two mutually insoluble liquid phases and having means for conducting the heat away at the same time.

For example, such an apparatus can comprise a container, a cooler, and a pump, as described in the basic application.

The mixture of solvent, cyclododecanone oxime, and sulfuric acid or oleum, corresponding in composition to the mixture after the stationary state has been reached, is cycled in the apparatus.

The two components of the extraction, namely the solution of the oxime in the solvent and the sulfuric acid or oleum, are continuously fed into the cycled stream at a point where the immediate thorough mixing of the fresh material with the cycled stream is ensured. The two components are preferably delivered by separate pipelines.

The extraction is accomplished with extraordinary rapidity if the two phases are well mixed with each other, and it is generally terminated quantitatively after a few minutes. The treatment time in the system can be controlled, for example, by maintaining a given level in the container.

The extraction process is accomplished by a considerable evolution of heat resulting from the complexing of the oxime with the sulfuric acid. This heat must be removed by cooling in order to avoid spontaneous heating of the oxime sulfuric acid complex which would bring about the rearrangement reaction. In addition, the amount of heat introduced by the oxime solution must also be removed.

The amount of heat removed in the extraction stage under the mildest conditions exceeds 60% of the total amount of heat to be removed in the entire process. This means that the conversion stage, which determines the yield and quality of the lactam, is relieved of the main load of spontaneous reaction heat.

The extraction mixture flows continuously into a first separating vessel. In this vessel, the mixture is separated into the pure oxime-free solvent and the liquid oxime-sulfuric acid.

The liquid oxime-sulfuric acid is fed to the conversion stage.

In a system as described, for example, in the basic application, comprising a second container, a cooler, and a pump, a mixture of the lactam and the sulfuric acid or the oleum, corresponding to the composition after the stationary conversion state has been established, is cycled at the desired reaction temperature. While lactam-sulfuric acid is continuously withdrawn for processing the same in the hydrolysis stage, the loss is compensated by a continuous addition of fresh oxime-sulfuric acid from the first separating vessel. Instead of the one-stage reactor, a two- or multi-stage cascade can be used whereby shorter reaction times are realized. The reaction time of the mixture in the second system is such that a practically quantitative conversion to the lactam takes place. This reaction time is dependent on the amount and concentration of the sulfuric acid or oleum, as well as on the temperature.

At temperatures between 90 and 120° C., reaction times of about 10 to 60 minutes are generally employed.

A tabulation of the dependency relationships between the oxime conversion and the reaction temperature, acid concentration, and amount of acid in a one- or two-stage process is set forth in the following table:

TABLE

| Weight ratio of oxime: $H_2SO_4$ | Concentration of $H_2SO_4$ percent | No. of conversion | Reaction temp. in °C. | Reaction period in minutes | Conversion to oxime in percent |
|---|---|---|---|---|---|
| 1:0.8 | 95 | 1 | 115 | 30 | 80.6 |
| 1:1 | 95 | 1 | 115 | 30 | 89.1 |
| 1:1.25 | 96 | 1 | 115 | 30 | 98 |
| 1:1.25 | 96 | 1 | 120 | 20 | 99 |
| 1:1.25 | 98 | 1 | 115 | 15 | 99 |
| 1:1.25 | 96 | 2 | 100 | 2×30 | 96.4 |
| 1:1.25 | 96 | 2 | 115 | 2×15 | 99.3 |
| 1:1.25 | 96 | 2 | 115 | 2×30 | 99.9 |

The conversion product of lactam sulfuric acid that is continuously withdrawn from the second vessel is separated in the hydrolysis stage into dilute sulfuric acid and a solution of lactam in a solvent. The lactam content of the mixture that is fed to the hydrolysis stage generally amounts to 30–55, preferably 40–50% by weight. Into an agitated vessel, there is continuously introduced the conversion mixture from the second vessel, as well as water and a solvent. Enough water is added so that a dilute sulfuric acid is obtained which can be separated from the organic phase. Generally, the concentration of this dilute sulfuric acid will be about 15–45% by weight, preferably 20–30% by weight.

Even though any suitable liquid appears to be usable for dissolving the lactam liberated during the hydrolysis step, in the present invention the pure solvent separated in the first separating vessel is used and is returned directly to the hydrolysis vessel for use as a carrier for the lactam through the further purification stages. After its distillative separation from the lactam it is returned to the oximation stage.

In a particularly advantgaeous embodiment, two solvent cycles are employed, i.e. the solvent from the first separating vessel is then returned to the oximation stage. Between the hydrolysis vessel and the processing stage for the purified lactam solution, a separate solvent cycle is introduced. Such a mode of operation has the advantage that different solvent concentrations, i.e. amounts of cycled solvent, can be employed in the two cycles.

Furthermore, in case of disturbances in the process, there can be avoided, for example, an oxime breakthrough from the extraction system via the first separating vessel to the hydrolysis vessel.

The mixture that is forced from the hydrolysis vessel by means of a pump into the second separating vessel is here divided into dilute sulfuric acid and lactam solution. The separated hot dilute sulfuric acid having a concentration of 15–45%, preferably 20–30% by weight, still contains about 0.3% dissolved lactam.

This amount of lactam can easily be recovered by cooling the hot acid to crystallize the lactam therefrom, or the solvent before its introduction into the hydrolysis stage can be employed for washing the waste acid in a suitable apparatus.

The resulting lactam solution is washed in the usual manner and fed to the distillation apparatus. Simultaneously, the additional liquid which is cycled is added to the system in the above-mentioned amounts, i.e. in quantities ensuring a liquid phase.

The mixture of different substances, i.e. solvent, lactam, and additional liquid, is fractionally distilled, if desired, under decreased pressure (advantageously at 3 to 15 mm. Hg (torr), or it is continuously distilled in a system comprising several columns.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE I

Approximately 30% solution of cycledodecanone oxime in hydrocumene is charged at 2.3 kg./hr. in a continuous stream and at a temperature of about 90° C. via a heated dosing device into an agitated vessel of 2 liters capacity serving as the extraction device. At the same time 0.98 kg./hr. of 96% sulfuric acid are added via a further dosing device under strong agitation and the temperature of the extraction vessel is maintained at 40° C. by cooling.

By a suitably provided overflow pipe, the filling volume is adjusted to about 1.0 liters and the resulting treatment time is about 20 minutes.

About 3.2 kg./hr. of a mixture of hydrocumene and oxime-sulfuric acid are withdrawn and after being held about 30 minutes in a separating flask at 40° C. are separated into the two phases.

While the oxime-free hydrocumene passes directly into the hydrolysis portion described below, about 1.6 kg./hr. of the practically solvent free oxime-sulfuric acid flow into another agitated vessel of 2 liters capacity. This second agitated vessel serves as the conversion apparatus and is likewise adjusted to a filling volume of about 1.2 liters by means of an overflow pipe. The temperature in the conversion vessel is kept at 115–117° C. by cooling. The conversion time, under the above-mentioned charging conditions, is about 60 minutes.

From the overflow pipe of the conversion vessel about 1.6 kg./hr. of the mixture consisting of lactam-sulfuric acid are withdrawn and vigorously stirred about 30 minutes at 90 to 100° C. in an agitated vessel of 4 liters capacity serving as the hydrolysis stage. Along with the mixture of lactam-sulfuric acid about 2.5 kg./hr. of water, as well as the hydrocumene withdrawn from the first separating vessel are added to the hydrolysis stage.

Through an overflow pipe, about 5.7 kg./hr. of the resulting hydrolysis mixture are introduced into a second separating flask. Here about 30 minutes at 90–100° C. the separation takes place into about 2.3 kg. of an approximately 30% solution of lactam in hydrocumene, and about 3.3 kg. of an approximately 25% solution of sulfuric acid. The hot waste acid still contains about 0.3% dissolved lactam, corresponding to about 1 to 2% of the converted lactam. This amount of lactam can easily be recovered by cooling the hot acid to crystallize out the lactam, or by using for example, the hydrocumene before it is introduced into the hydrolysis stage, for washing the waste acid in a suitable apparatus.

The lactam solution withdrawn from the second separating flask is conventionally subjected to a washing process of one or more stages and is then fed to a distillation apparatus.

Into the first solvent separating column there is introduced, together with the lactam solution, 0.10 kg./hr. of cyclododecanone, preferably at the middle of the column. The hydrocumene is withdrawn via the head of this column at about 62° C. and approximately 60 mm. Hg (torr), and the sump product consisting of lactam and cyclododecanone is fed to a second column wherein the cyclododecanone is separated via the head at about 118° C. and about 3-mm. Hg and returned to the first column as the additional liquid. In a third column, the crude lactam obtained as the sump product in the second column is purified by distillation.

With an hourly charge of 0.70 kg. of a 98% cyclododecanone oxime, 0.656 kg./hr. of a distilled pure lactam are obtained having a melting point of 151–152° C. and an APHA color number of 5 to 10.

This corresponds to a yield of 95.5% of the theoretical.

EXAMPLE II

The process of Example I is repeated with ethyl benzene substituted for the hydrocumene.

The lactam solution withdrawn from the second separating flask and then fed to a distillation apparatus is therefore a solution of lactam in ethyl benzene.

Into the first solvent separating column there is introduced, together with the lactam solution, 0.10 kg./hr. of cyclododecanone, preferably at the middle of the column. The ethyl benzene is withdrawn via the head of this column at about 62° C. and approximately 60 mm. Hg (torr). The sump temperature of the column operating at a pressure of about 65–66 mm. Hg (torr) is about 200–210° C. The sump product consisting of lactam and cyclododecanone is fed to the second column.

In the second column the cyclododecanone is separated at the head at about 118° C. and 3 mm. Hg and a portion is returned to the first column as the additional liquid. The sump temperature of the second column operating at a pressure of about 18 mm. Hg is about 217° C. The lactam sump product is fed to the third column.

In the third column the lactam is separated at the head at about 179° C. and 2 mm. Hg. The sump temperature of the third column operating at a pressure of about 5 mm. Hg is about 190° C. The residue in the sump is fed to a residue recovery stage.

EXAMPLE III

The process of Example II is repeated without the addition of the intermediate boiling compound cyclododecanone to the distillation apparatus. Without the addition of this intermediate boiling compound, the sump temperature of the first solvent separating column must be about 40–50° C. higher since the minimum pressure for avoiding crystallization of the lactam in the column is 400 mm. Hg. The effect of this sump temperature rise from about 200° C. to about 250° C. upon the polymerization of the lactam and thus upon the product losses is demonstrated in the following table:

| Time of heating laurolactam under 100 mm. Hg | Percentage of laurolactam polymerized for the period of time listed in column 1 at the temperatures listed in columns 2 and 3 | |
| --- | --- | --- |
| Col. 1 | Col. 2 | Col. 3 |
| Hours | 200° C. | 250° C. |
| 2 | 0.4 | 0.7 |
| 8 | 0.85 | 1.4 |
| 16 | 0.85 | 3.7 |
| 32 | 1.0 | 8.0 |

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for recovering a lactam from the reaction mixture obtained by sulfuric acid rearrangement of oximes of cycloaliphatic ketones comprising:
   (a) mixing concentrated sulfuric acid with a solution of oxime and a solvent substantially immiscible with sulfuric acid at a temperature about 0 to 60° C. whereby a solution of oxime in sulfuric acid is formed;
   (b) separating said solution of oxime in sulfuric acid from said solvent substantially immiscible with sulfuric acid;
   (c) reacting said solution of oxime in sulfuric acid at a temperature about 60 to 140° C. whereby said oxime is rearranged to the corresponding lactam and a mixture of lactam and sulfuric acid is formed;
   (d) hydrolyzing said mixture of lactam and sulfuric acid with water and said solvent separated in (b) whereby a lactam containing solvent phase and a dilute sulfuric acid phase are formed;
   (e) separating said lactam containing solvent phase and said dilute sulfuric acid phase;
   (f) the improvement comprising: adding an intermediate boiling compound to said lactam containing solvent phase (e), said intermediate boiling compound being miscible with said lactam containing solvent phase under distillation conditions, and having a boiling point under distillation conditions above the boiling point of said solvent lower than the boiling point of said lactam, and not substantially below the melting point of the lactam;
   (g) recovering said solvent by distillation from said intermediate boiling compound and said lactam; and
   (h) recovering said intermediate boiling compound by distillation from said lactam.

2. In a process for recovering a lactam from the reaction mixture obtained by sulfuric acid rearrangement of oximes of cycloaliphatic ketones wherein a lactam is dissolved in a solvent, the improvement comprising the further steps of:
   (a) adding an intermediate boiling compound to the lactam dissolved in a solvent, said intermediate boiling compound being miscible with the lactam and solvent phase under distillation conditions, and having a boiling point under distillation conditions higher than the boiling point of said solvent, lower than the boiling point of said lactam, and not substantially lower than the melting point of the lactam;
   (b) distilling said solvent as overhead from the mixture of said intermediate boiling compound and said lactam; and (c) distilling said intermediate boiling compound from said lactam.

3. The process of claim 1, wherein said lactam of (h) is laurolactam.

4. The process of claim 1, wherein said intermediate boiling compound has a boiling point under distillation conditions higher than the melting point of said lactam.

5. The process of claim 3, wherein said intermediate boiling compound is cyclododecanone.

6. The process of claim 1, wherein said solvent is selected from the group consisting of aliphatic, cycloaliphatic and aromatic hydrocarbons having a boiling point between 80 and 200° C.

7. The process of claim 1, wherein said intermediate boiling compound is selected from the group consisting of aliphatic, cycloaliphatic and aromatic hydrocarbons having a boiling point between 140 and 200° C. under distillation conditions.

8. The process of claim 6, wherein said intermediate boiling compound is selected from the group consisting of aliphatic, cycloaliphatic and aromatic hydrocarbons having a boiling point between 140 and 200° C. under distillation conditions.

9. The process of claim 8, wherein said lactam of (h) is laurolactam.

10. The process of claim 9, wherein said intermediate boiling compound has a boiling point under distillation conditions of not more than 20° C. lower than the melting point of laurolactam.

11. The process of claim 1, wherein said solvent is about 90 to 150 parts per 100 parts by weight of said lactam and said intermediate boiling compound is about 5 to 30 parts per 100 parts by weight of said lactam.

12. The process of claim 9 wherein said lactam is laurolactam.

13. The process as defined by claim 12, wherein said solvent is about 900 to 150 parts per 100 parts by weight of said lactam and said intermediate boiling compound is about 5 to 30 parts per 100 parts by weight of said lactam.

14. The process of claim 13, wherein said solvent is selected from the group consisting of aliphatic, cycloaliphatic and aromatic hydrocarbons having a boiling point between 80 and 200° C.

15. The process of claim 14, wherein said intermediate boiling compound is selected from the group consisting of aliphatic, cycloaliphatic and aromatic hydrocarbons having a boiling point between 140 and 200° C. under distillation conditions.

16. The process of claim 12, wherein said intermediate boiling compound is cyclododecanone.

17. A process as defined by claim 1, wherein said intermediate liquid under distillation conditions boils at least 10° C. lower than said lactam and at least 10° C. higher than said solvent.

18. A process as defined by claim 13, wherein said intermediate liquid under distillation conditions boils at least 10° C. lower than said lactam and at least 10° C. higher than said solvent.

19. A process as defined by claim 10, wherein said intermediate liquid under distillation conditions boils at least 10° C. lower than said lactam and at least 10° C. higher than said solvent.

References Cited
UNITED STATES PATENTS

| | | | |
|---|---|---|---|
| 2,249,177 | 7/1941 | Schlack | 260—239.3 |
| 2,313,026 | 3/1943 | Schlack | 260—239.3 |
| 2,752,336 | 6/1956 | Boon et al. | 260—239.3 |
| 3,060,173 | 10/1962 | Von Schickh et al. | 260—239.3 |

HENRY R. JILES, Primary Examiner

R. T. BOND, Assistant Examiner

U.S. Cl. X.R.

203—53, 68; 252—73, 77

UNITED STATES PATENT OFFICE
CERTIFICATE OF CORRECTION

Patent No. 3,462,417   Dated August 19, 1969

Inventor(s) Karl-Hans Simmrock and Gunther Strauss

It is certified that error appears in the above-identified patent and that said Letters Patent are hereby corrected as shown below:

Column 8, Line 11, change "8.0" to ---8.4---

Column 9, Line 31, change "90" to ---900---

SIGNED AND SEALED

SEP 29 1970

(SEAL)
Attest:

Edward M. Fletcher, Jr.
Attesting Officer

WILLIAM E. SCHUYLER, JR.
Commissioner of Patents